United States Patent [19]

Walter et al.

[11] Patent Number: 4,717,264

[45] Date of Patent: Jan. 5, 1988

[54] BALL BEARING FOR LENGTHWISE MOVEMENT

[75] Inventors: Lothar Walter, Schweinfurt; Uwe Mayer, Münnerstadt; Otmar Winkler, Schweinfurt; Herbert Dobhan, Bergrheinfeld, all of Fed. Rep. of Germany

[73] Assignee: SKF Linearsysteme GmbH, Schweinfurt, Fed. Rep. of Germany

[21] Appl. No.: 847,287

[22] Filed: Apr. 2, 1986

[30] Foreign Application Priority Data

Apr. 2, 1985 [DE] Fed. Rep. of Germany ....... 3512013

[51] Int. Cl.⁴ ............................................. F16C 29/06
[52] U.S. Cl. ........................................ 384/43; 384/45
[58] Field of Search .................................. 384/43–45; 464/168

[56] References Cited

U.S. PATENT DOCUMENTS 3,844,629 10/1974 Haines .
4,553,796 11/1985 Walter et al. ......................... 384/45
4,572,591 2/1986 Walter et al. ......................... 384/45

FOREIGN PATENT DOCUMENTS 1287382 1/1969 Fed. Rep. of Germany ........ 384/43
2401225 7/1975 Fed. Rep. of Germany ........ 384/43
2406046 8/1975 Fed. Rep. of Germany ........ 384/45

Primary Examiner—Stuart S. Levy
Assistant Examiner—Thomas R. Hannen
Attorney, Agent, or Firm—Rosen, Dainow & Jacobs

[57] ABSTRACT

A ball bearing for lengthwise movement has a cage sleeve between a shaft and a housing. The cage sleeve has a plurality of circumferentially distributed channels in which a corresponding row of circulating balls is arranged. The balls loaded by the shaft travel in one linear raceway and return unloaded in another linear raceway, the ends of the linear raceways being connected by a pair of reversing raceways. A load-transmitting raceway rail is seated in each of a plurality of openings in the cage sleeve. Each raceway rail has a raceway groove formed by an inner shoulder and an outer shoulder which overlies the linear raceway for loaded balls, a surface portion which overlies the linear raceway for unloaded balls, and a pair of end surfaces which overlie the respective reversing raceways. These end surfaces are substantially parallel to a hypothetical half-circle defined by the path of a center point of a ball during travel in the corresponding reversing raceway and are substantially tangent to a hypothetical extension of the raceway groove such that smooth rolling of a circulating ball is enabled during transitions between the linear raceway for loaded balls and the reversing raceways.

10 Claims, 5 Drawing Figures

4,717,264

BALL BEARING FOR LENGTHWISE MOVEMENT

FIELD OF THE INVENTION

The invention relates to a ball bearing for lengthwise movement of the type having a plurality of raceway rails inserted in a cage sleeve, each raceway rail having a groove for guiding the loaded balls of the row of circulating balls.

BACKGROUND OF THE INVENTION

A ball bearing of the foregoing type having a raceway rail with a longitudinally directed, throughgoing raceway groove for the loaded balls of a row of circulating balls is shown in FIG. 5 of DE-OS No. 2003535. At both longitudinal ends of the raceway rail a reversing groove is formed in the rail running along a segment of a circle, which is connected to the linear raceway groove for the loaded balls and which overlies the reversing raceway of the cage sleeve. In order to avoid damaging jamming of the balls in the reversing raceway, the shape of the reversing groove must be manufactured extremely accurately and arranged exactly over the associated reversing raceway of the cage sleeve. The known ball bearing for this reason has the disadvantage that the corresponding opening in the cage sleeve must be manufactured within very close tolerances in order to accurately hold the raceway rail. In addition, the reversing groove of the raceway rail having a profile conforming to the balls cannot be formed without difficulty. The known ball bearing for lengthwise movement is for this reason expensive to manufacture.

SUMMARY OF THE INVENTION

The object of the invention is to provide a ball bearing of the above-discussed type which can be economically manufactured, wherein the danger of jamming of the balls in the area of the reversing raceway of the cage sleeve can be prevented despite the adoption of relatively wider manufacturing tolerances.

This object is achieved in accordance with the invention by providing a raceway rail having a longitudinal raceway groove formed by inner and outer shoulders. The end surfaces on the radially inwardly directed side of the raceway rail are substantially parallel to a hypothetical half-circle surface, the circumference of which is defined by the arc traveled by the center point of a ball during travel in the corresponding reversing raceway. Also, the end surfaces are substantially tangent to a hypothetical extension of the longitudinal raceway groove such that the end surfaces are connected to the respective ends of the groove without a step, thereby enabling smooth rolling of a circulating ball during transitions between the linear raceway in which the balls are loaded and the reversing raceways and savings in manufacturing costs.

In accordance with the invention, each raceway rail can be somewhat displaced in the longitudinal direction when inserted in the associated opening in the cage sleeve without the circulating balls being jammed in the corresponding reversing raceways in the cage sleeve. Accordingly, the longitudinal dimensions of the openings in the cage sleeve can lie within large tolerance ranges.

The balls of each row undergo a change in direction upon traversal of the reversing raceway, so that centrifugal forces act on the balls, as a result of which these balls press against the outer wall of the reversing raceway and are guided along this outer wall. On their way from the reversing raceway into the longitudinally directed raceway for loaded balls, the unloaded balls next came into contact with the outer shoulder of the raceway groove formed in the rail and roll directly into the base of the raceway groove and against the inner shoulder of the raceway rail. The balls entering the raceway no longer sustain centrifugal forces and are gradually loaded by the shaft, so that a shock-free and low-friction entrance of the balls from the reversing raceways into the linear raceway for loaded balls is achieved.

Analogously, the balls of each row exit from the corresponding raceway groove into the connecting reversing raceway of the cage sleeve with no shocks and low friction.

In accordance with a further feature of the invention, each raceway rail is arranged in a corresponding opening in the cage sleeve such that the midplane of the raceway groove is displaced by a predetermined distance from a midplane of the linear raceway for loaded balls, this displacement being in a circumferential direction toward the linear raceway for unloaded balls. In this manner a relatively small play of the loaded balls between the outer shoulder of the raceway groove and the opposing wall of the linear raceway for loaded balls results both upon entrance of the balls in this linear raceway as well as upon exit of the balls therefrom. Therefore the loaded balls are able to roll into and out of the connected reversing raceways at both ends of the linear raceway.

Naturally the amount of circumferential displacement of the raceway groove of the rail relative to the linear raceway for loaded balls cannot be greater than half the lateral play of the balls in this linear raceway, because otherwise damaging jamming of the loaded balls between the outer shoulder of the raceway groove and the opposing wall of the linear raceway would occur.

BRIEF DESCRIPTION OF THE DRAWINGS

The preferred embodiment of the invention will be described in detail with reference to the following drawings, wherein.

DETAILED DESCRIPTION OF THE PREFERRED EMBODIMENT

Figure 1:
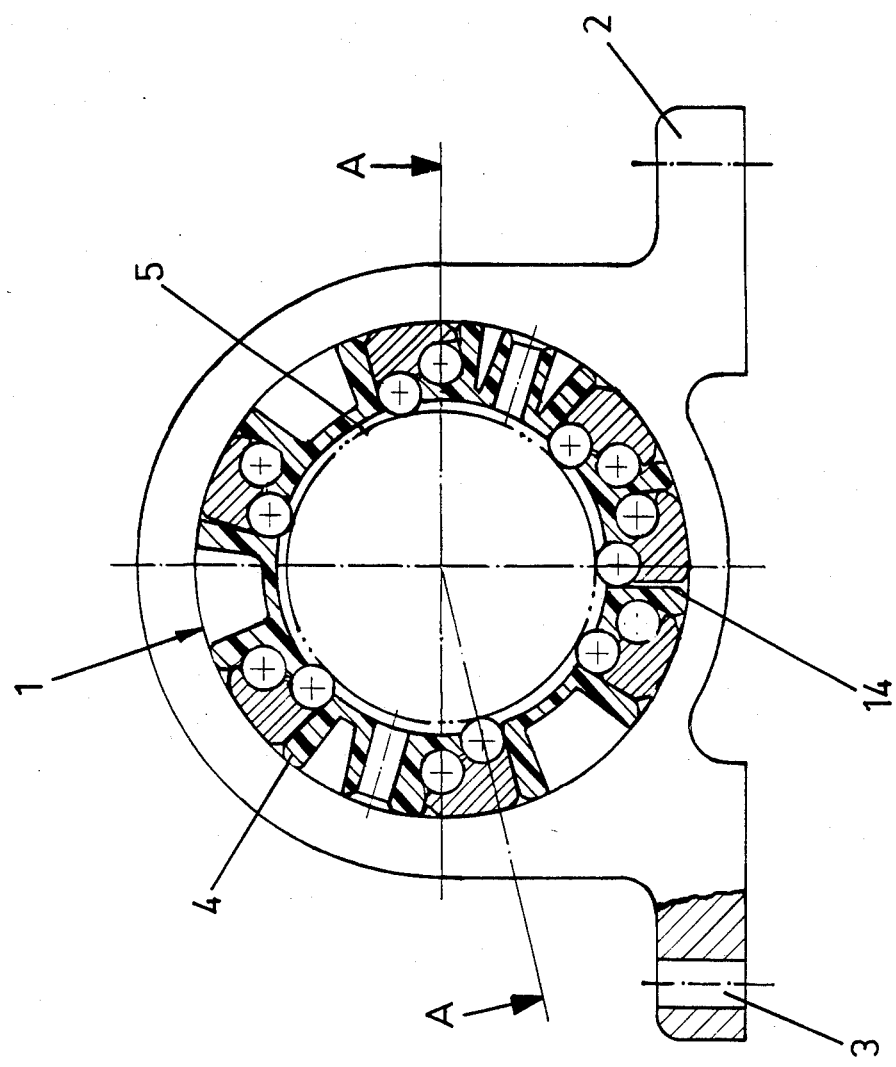
FIG. 1 is a cross-sectional view of the ball bearing for lengthwise movement in a housing.
Figure 2:
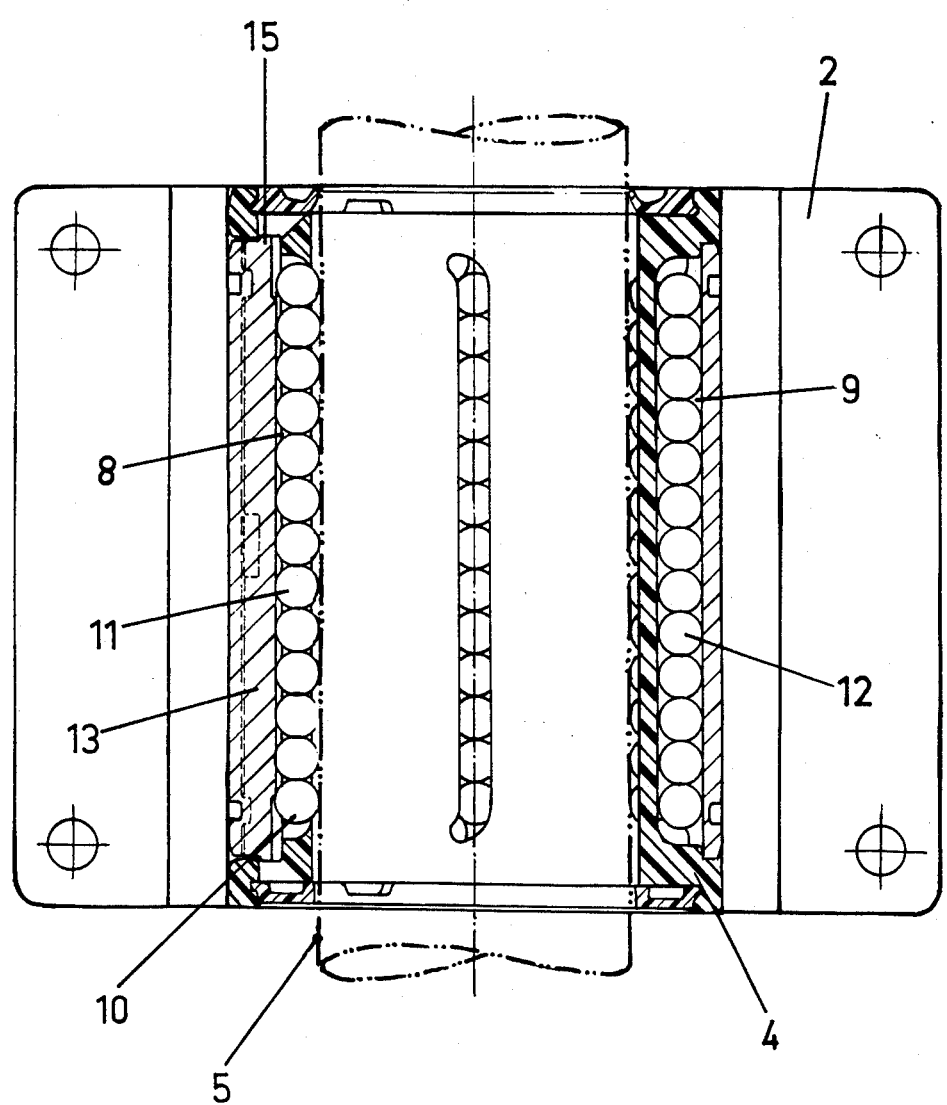
FIG. 2 is a longitudinal sectional view taken along line A—A in FIG. 1.

The reference numeral 1 in FIGS. 1 and 2 generally denotes a ball bearing for lengthwise movement and reference numeral 2 denotes a pedestal bearing housing. Throughgoing holes 3 are formed in both feet of the pedestal bearing housing. The pedestal bearing housing 2 is fastened to a foundation or machine frame (not shown) by any conventional means such as cap screws (not shown) inserted in holes 3.

The ball bearing 1 comprises a cage sleeve 4 which encircles a cylindrical shaft 5 (indicated by the dash-dot lines in FIGS. 1 and 2). In this case the cage sleeve 4 is made from an elastic plastic material by injection molding. A plurality of circumferentially distributed channels 6 are formed in the cage sleeve 4. An endless row 7 of balls are installed in each channel.

Each cage channel 6 comprises a pair of raceways 8 and 9 which are circumferentially adjacent one another and are longitudinally directed. The ends of raceways 8 and 9 are respectively interconnected by semicircular reversing raceways 10. The loaded balls 11 of each row 7 of balls roll along raceway 8 and the unloaded balls 12 roll in the two reversing raceways 10 and in the return raceway 9 of the respective cage channel. The balls 11 and 12 are made of rolling bearing steel.

Each cage channel 6 of the cage sleeve 4 is radially outwardly covered by a load-carrying raceway rail 13 made of hardened steel which is supported in a bore of the pedestal bearing housing 2. The raceway rail 13 is manufactured from a molded blank which is cut from a bar.

During assembly a raceway rail 13 is pressed radially inwardly into each opening 14 of cage sleeve 4, so that the end projections 15 of the raceway rails 13 snap behind undercuts 16 (FIG. 5) in the opposing end walls of openings 14 and the raceway rail 13 is securely locked in the opening 14 (FIG. 2).

Figure 5:
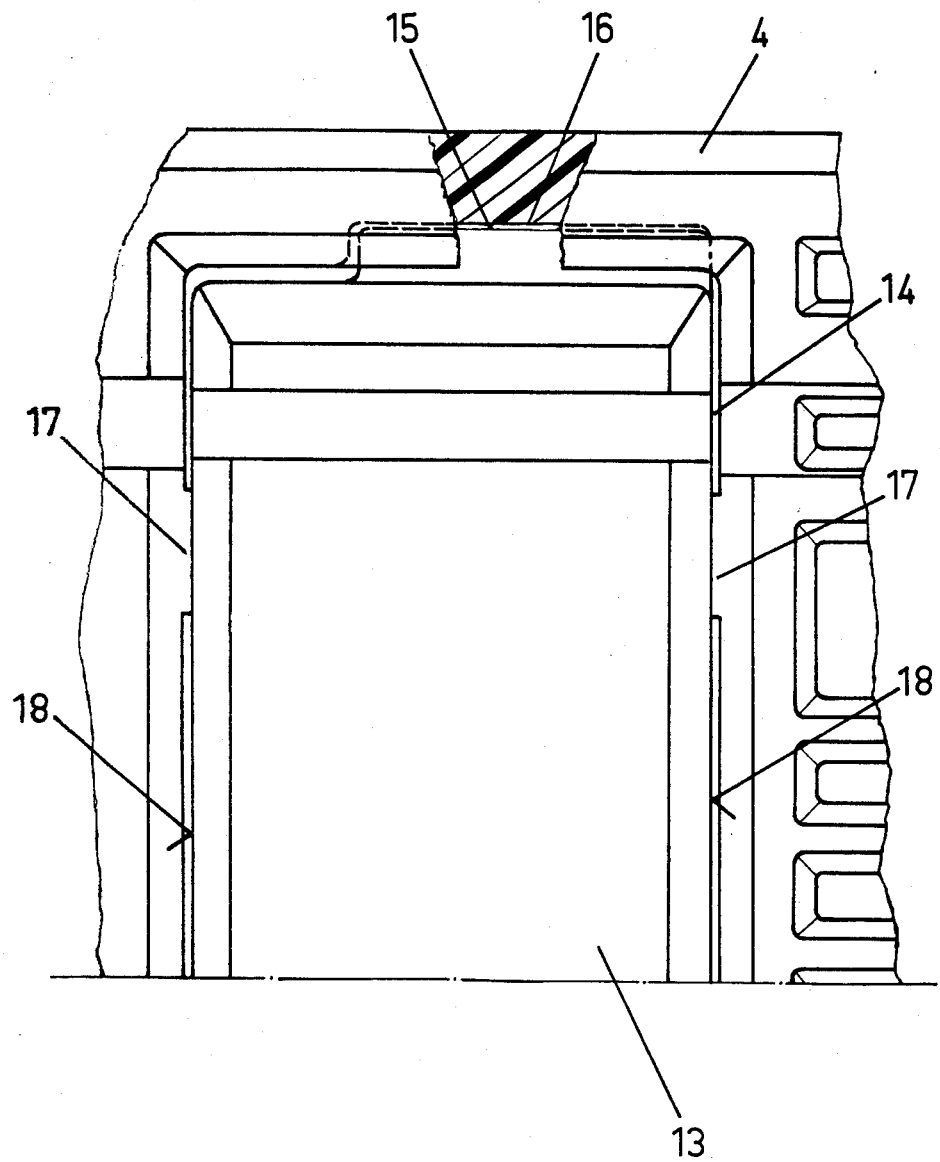
FIG. 5 is a partial top view, taken in the direction of arrow B in FIG. 4, of the raceway rail.

The longitudinal walls of opening 14 have locking projections arranged next to each other which engage the opposing longitudinal surfaces 18 of raceway rail 13 and which lock the raceway rail 13 in a predetermined position relative to the raceway 8 of the corresponding row 7 of balls (FIG. 5).

The radially inwardly directed side of each rail 13 has a central surface 19 with a longitudinal raceway groove 20, the profile of which substantially conforms to the circular contour of the balls 11, 12. The loaded balls 11 of the corresponding row 7 roll between the shaft 5 and the raceway groove 20 of rail 13.

Figure 4:
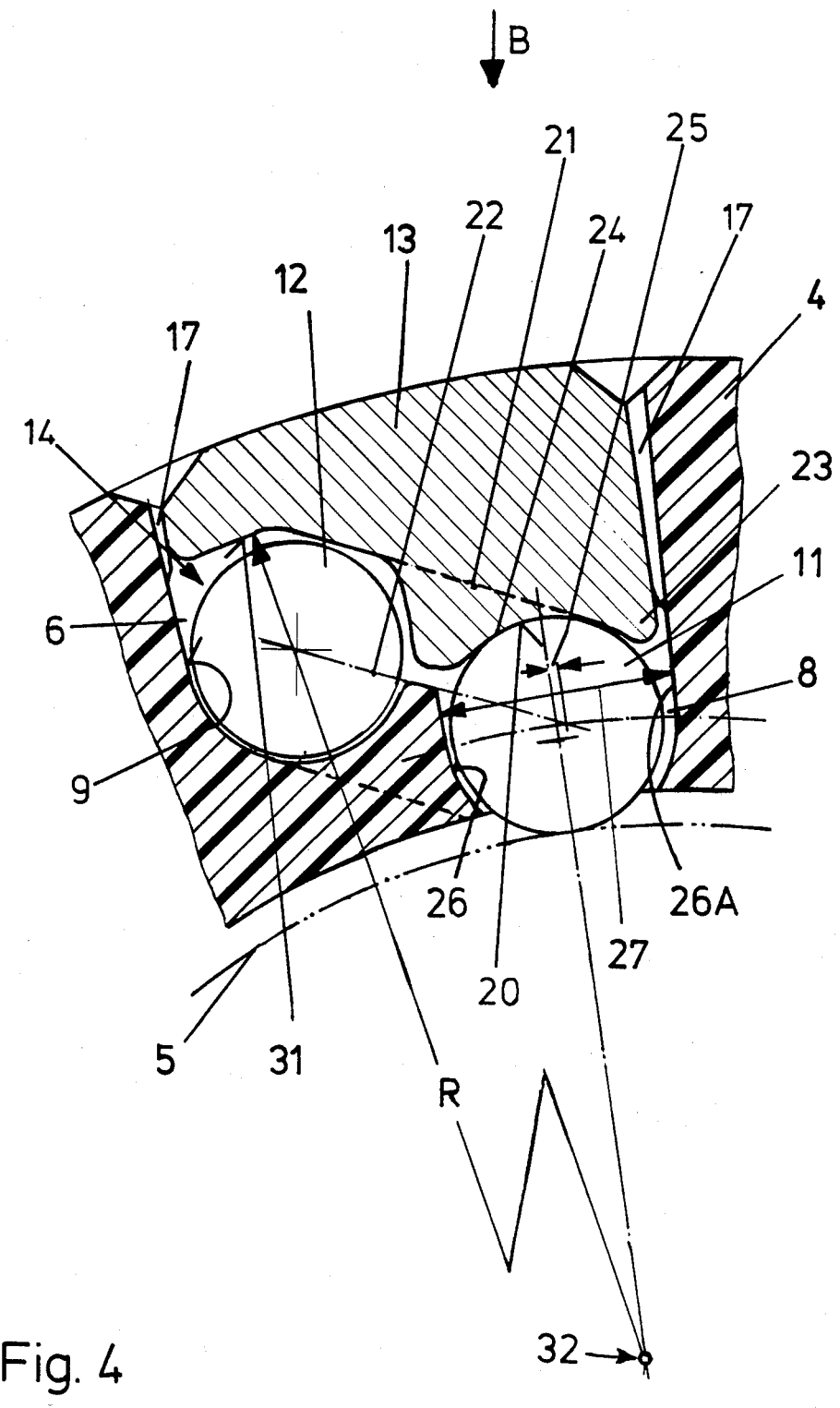
FIG. 4 is an enlarged partial sectional view of a raceway rail and surrounding portions of the cage sleeve in accordance with the preferred embodiment of the invention.

At both ends of the central surface 19 the radially inwardly directed side of the raceway rail 13 is integrally connected to an end surface 21 which radially outwardly covers the corresponding reversing raceway 10 of the row 7 of balls. Each end surface 21 is substantially parallel to the planar surface of the half-circle 22 of the corresponding reversing raceway (as seen in FIG. 4) and is joined to the base of the raceway groove 20 without a step therebetween. The term "half-circle" as used herein refers to the semicircular locus of the centers of the balls as they move in the corresponding reversing raceway.

The raceway groove 20 of rail 13 comprises an outer shoulder 23 on the side away from raceway 9 for unloaded balls 12. The ends of outer shoulder 23 extend longitudinally onto the end surfaces 21 on the radially inwardly directed side of rail 13. In this case outer shoulder 23 extends linearly from one end of rail 13 to the other.

The raceway groove 20 further comprises an inner shoulder 24 opposing the outer shoulder 23 in the area of the corresponding raceway 8. The ends of inner shoulder 24 are adjacent to the corresponding end surfaces 21. The raceway groove 20 of rail 13 together with the inner and outer shoulders are finished by grinding along its entire length using a profile-grinding disk.

Each raceway rail 13 is fixed in the corresponding opening 14 such that the midplane of raceway groove 20 is displaced a predetermined distance 25 from the midplane of raceway 8 in the direction of corresponding raceway 9. In accordance with the foregoing embodiment the dimension 25 of this circumferential displacement is substantially equal to 0.02d, where d is the diameter of the balls 11, 12. Therefore, the opposing walls 26 and 26A of each raceway 8 are separated by a circumferential distance 27 which is substantially equal to 1.06d at a radial distance of 0.5d from the shaft (FIG. 4).

Figure 3:
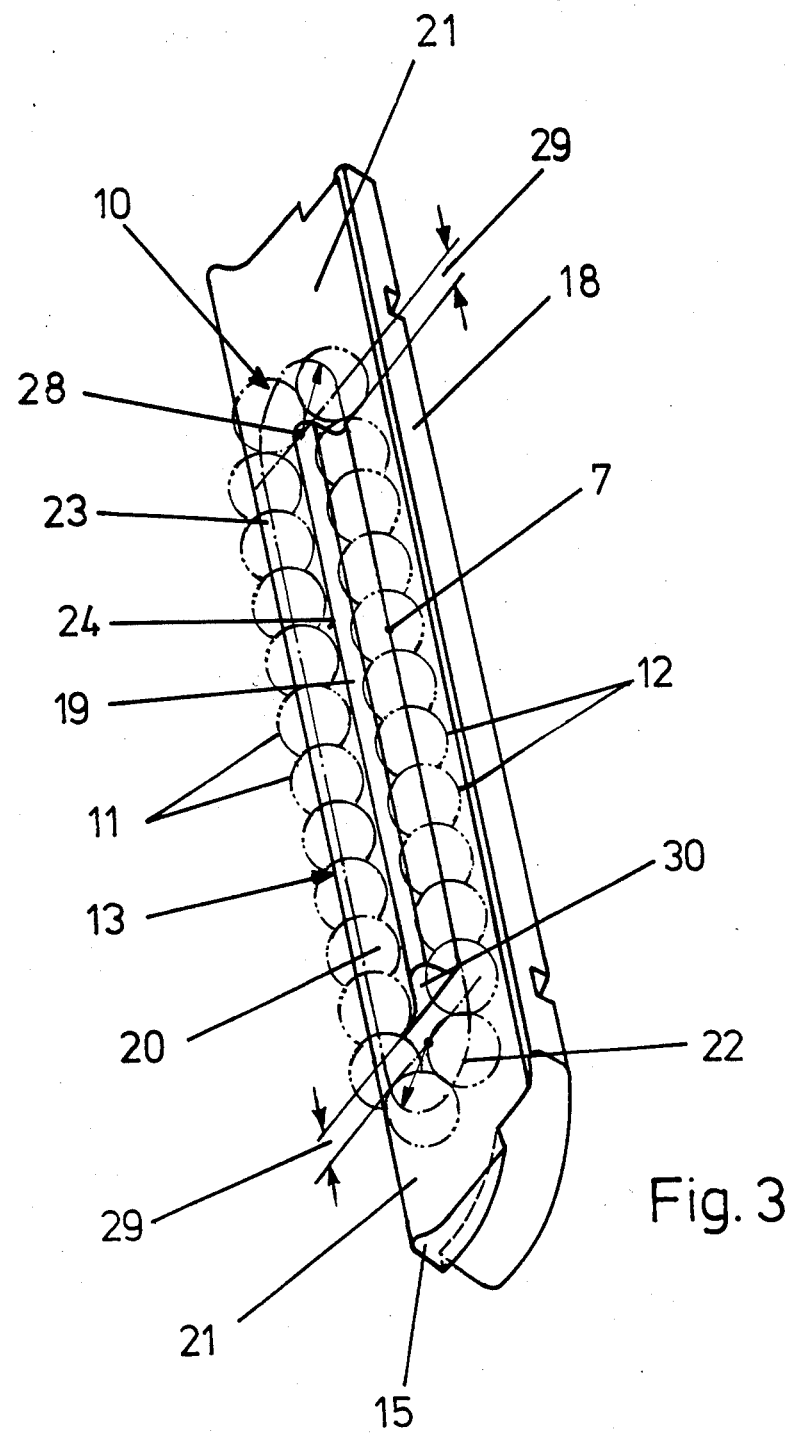
FIG. 3 is a perspective depiction of the raceway rail incorporated in the ball bearing of FIGS. 1 and 2.

As depicted in FIG. 3, the center of curvature 28 of the half-circle 22 of each reversing raceway 10 is arranged at a distance 29 from the nearest end 30 of the inner shoulder 24. In the foregoing case this distance is substantially equal to 0.2d.

The raceway rail 13 has a surface portion 31 on its radially inwardly directed side which radially outwardly covers the raceway 9 for the unloaded balls 12 and which is continuous with both end surfaces 21 of the raceway rail 13. Surface portion 31 is cylindrical and has a radius of curvature R, the center of curvature lying along the longitudinal axis 32 of the ball bearing 1 (FIG. 4).

The above-described ball bearing for longitudinal movement can be modified without departing from the inventive concept herein disclosed. For example, the cage sleeve of the ball bearing need not be enclosed on its circumference, but rather the sleeve can alternatively be provided with longitudinal throughgoing slits, so that the cage sleeve only partly encircles the shaft.

The loaded balls of one or all of the rows of balls in the cage sleeve can also roll in a longitudinal raceway groove formed in the shaft. These balls then carry not only radial forces but also circumferential forces (moment loads) from the shaft onto the housing by way of the respective raceway rails. It is also not absolutely necessary that the surface of the half-circle of the reversing raceway of the cage sleeve, and consequently the end surfaces of the raceway rail outwardly covering these reversing raceways, be planar. These surfaces can alternatively be formed as radially outwardly convex cylindrical surfaces, as a result of which the corresponding parallel end surfaces of the raceway rail are also formed as cylindrical surfaces.

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed.

What is claimed is:

1. In a ball bearing for lengthwise movement between a shaft and a housing, said ball bearing comprising a cage sleeve which encircles said shaft and which is provided with a plurality of first linear raceways and a plurality of second linear raceways for guiding loaded and unloaded balls respectively in a plurality of respective endless row of balls, and a plurality of pairs of semicircular reversing raceways connecting said first and second linear raceways, said linear and reversing raceways forming respective paths of travel for circulating balls of said rows, and further comprising a plurality of load-transmitting raceway rails arranged in a corresponding plurality of radial openings in said cage sleeve, each of said raceway rails having a central surface on its radially inwardly directed side with a longitudinal raceway groove for guiding said loaded balls of a corresponding row and having a pair of end surfaces at opposing ends of said central surface which radially outwardly cover said corresponding reversing raceways in which said row of balls travel, the improvement wherein each of said longitudinal raceway grooves opposes a corresponding one of said first linear raceways and is formed by an outer shoulder and an inner shoulder, said outer shoulder extending longitudinally across said radially inwardly directed side of said corresponding raceway rail from a point on one of said end surfaces to a point on the other of said end surfaces, and said inner shoulder extending longitudinally between said end surfaces, said outer shoulder being arranged further away then said inner shoulder from a corresponding one of said second linear raceways, and wherein each of said end surfaces has a substantially planar surface portion which is substantially tangent to a hypothetical extension of said corresponding longitudinal raceway groove such that said planar surface portion of each of said end surfaces is connected to a corresponding end of said corresponding longitudinal raceway groove without a step, for enabling smooth rolling of a circulating ball during transitions between said corresponding first linear raceway and said corresponding reversing raceways.

2. The ball bearing as defined in claim 1, wherein the profile of said raceway groove formed in each of said raceway rails substantially conforms to the circular contour of said balls in said corresponding row.

3. The ball bearing as defined in claim 1, wherein said outer shoulder of each of said raceway grooves extends from one end to the other end of said corresponding raceway rail.

4. The ball bearing as defined in claim 1, wherein said raceway rail is provided with a surface portion on its radially inwardly directed side which radially outwardly covers said second linear raceway for unloaded balls, said surface portion being connected to said end surfaces in a stepless manner.

5. The ball bearing as defined in claim 4, wherein said surface portion of said raceway rail is formed as a cylindrical surface having a radius of curvature R, the center of said radius of curvature lying on a longitudinal axis of said ball bearing.

6. In a ball bearing for lengthwise movement between a shaft and a housing, said ball bearing comprising a cage sleeve which encircles said shaft and which is provided with a plurality of first linear raceways and a plurality of second linear raceways for guiding loaded and unloaded balls respectively in a plurality of respective endless row of balls, and a plurality of pairs of semicircular reversing raceways connecting said first and second linear raceways, said linear and reversing raceways forming respective paths of travel for circulating balls of said rows, and further comprising a plurality of load-transmitting raceway rails arranged in a corresponding plurality of radial openings in said cage sleeve, each of said raceway rails having a central surface on its radially inwardly directed side with a longitudinal raceway groove for guiding said loaded balls of a corrsponding row and having a pair of end surfaces at opposing ends of said central surface which radially outwardly cover said corresponding reversing raceways in which said row of balls travel, the improvement wherein each of said longitudinal raceway grooves opposes a corresponding one of said first linear raceways and is formed by an outer shoulder and an inner shoulder, said outer shoulder extending longitudinally across said radially inwardly directed side of said corresponding raceway rail from a point on one of said end surfaces to a point on the other of said end surfaces, and said inner shoulder extending longitudinally between said end surfaces, said outer shoulder being arranged further away than said inner shoulder from a corresponding one of said second linear raceways, and wherein each of said end surfaces is substantially parallel to a corresponding hypothetical half-circle surface, the circumference of said half-circle being defined by the path of a center point of a ball during travel of said ball in a corresponding one of said reversing raceways, and is substantially tangent to a hypothetical extension of said corresponding longitudinal raceway groove such that a portion of each of said end surfaces is connected to a corresponding end of said corresponding longitudinal raceway groove without a step, for enabling smooth rolling of a circulating ball during transitions between said corresponding first linear raceway and said corresponding reversing raceways, wherein each raceway rail is arranged in a corresponding opening in said cage sleeve such that a midplane of said corresponding raceway groove is displaced by a predetermined distance from a midplane of said corresponding first linear raceway, said displacement being in a circumferential direction toward said corresponding second linear raceway.

7. The ball bearing as defined in claim 6, wherein said predetermined distance is substantially equal to 0.02d, where d is the diameter of said balls.

8. The ball bearing as defined in claim 6, wherein said first linear raceway has first and second opposing walls, said opposing walls being separated by a circumferential distance which is substantially equal to 1.06d at points on said wall separated from said shaft by a radial distance substantially equal to 0.5d, where d is the diameter of said balls.

9. In a ball bearing for lengthwise movement between a shaft and a housing, said ball bearing comprising a cage sleeve which encircles said shaft and which is provided with a plurality of first linear raceways and a plurality of second linear raceways for guiding loaded and unloaded balls respectively in a plurality of respective endless row of balls, and a plurality of pairs of semicircular reversing raceways connecting said first and second linear raceways, said linear and reversing raceways forming respective paths of travel for circulating balls of said rows, and further comprising a plurality of load-transmitting raceway rails arranged in a corresponding plurality of radial openings in said cage sleeve, each of said raceway rails having a central surface on its radially inwardly directed side with a longitudinal raceway groove for guiding said loaded balls of a corresponding row and having a pair of end surfaces at opposing ends of said central surface which radially outwardly cover said corresponding reversing raceways in which said row of balls travel, the improvement wherein each of said longitudinal raceway grooves opposes a corresponding one of said first linear raceways and is formed by an outer shoulder and an inner shoulder, said outer shoulder extending longitudinally across said radially inwardly directed side of said corresponding raceway rail from a point on one of said end surfaces to a point on the other of said end surfaces, and said inner shoulder extending longitudinally between said end surfaces, said outer shoulder being arranged further away than said inner shoulder from a corresponding one of said second linear raceways, and wherein each of said end surfaces is substantially parallel to a corresponding hypothetical half-circle surface, the circumference of said half-circle being defined by the path of a center point of a ball during travel of said ball in a corresponding one of said reversing raceways, and is substantially tangent to a hypothetical extension of said corresponding longitudinal raceway groove such that a portion of each of said end surfaces is connected to a corresponding end of said corresponding longitudinal raceway groove without a step, for enabling smooth rolling of a circulating ball during transitions between said corresponding first linear raceway and said corresponding reversing raceways, wherein the centers of said half-circles are separated from the corresponding ends of said inner shoulders of said raceway groove on said raceway rail by a predetermined axial distance.

10. The ball bearing as defined in claim 9, wherein said predetermined axial distance is substantially equal to 0.2d, where d is the diameter of said balls.

* * * * *